United States Patent
Hioki et al.

(10) Patent No.: US 11,753,535 B2
(45) Date of Patent: Sep. 12, 2023

(54) PROPYLENE RESIN COMPOSITION AND SHAPED BODY COMPRISING SAME

(71) Applicant: SUMITOMO CHEMICAL COMPANY, LIMITED, Tokyo (JP)

(72) Inventors: Shogo Hioki, Tokyo (JP); Takeshi Maruyama, Chiba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 315 days.

(21) Appl. No.: 17/287,347

(22) PCT Filed: Oct. 17, 2019

(86) PCT No.: PCT/JP2019/040858
§ 371 (c)(1),
(2) Date: Apr. 21, 2021

(87) PCT Pub. No.: WO2020/085185
PCT Pub. Date: Apr. 30, 2020

(65) Prior Publication Data
US 2021/0380789 A1 Dec. 9, 2021

(30) Foreign Application Priority Data
Oct. 23, 2018 (JP) ................. 2018-198973

(51) Int. Cl.
*C08L 23/16* (2006.01)
*C08L 83/04* (2006.01)
*C08L 23/14* (2006.01)

(52) U.S. Cl.
CPC ............ *C08L 23/14* (2013.01); *C08L 23/16* (2013.01); *C08L 83/04* (2013.01); *C08L 2205/025* (2013.01); *C08L 2207/02* (2013.01); *C08L 2207/10* (2013.01); *C08L 2310/00* (2013.01)

(58) Field of Classification Search
None
See application file for complete search history.

(56) References Cited

U.S. PATENT DOCUMENTS

| | | |
|---|---|---|
| 2006/0229387 A1 | 10/2006 | Cho et al. |
| 2009/0137708 A1 | 5/2009 | Kim et al. |
| 2014/0288225 A1 * | 9/2014 | Shipley ............ C08L 53/025 524/451 |

FOREIGN PATENT DOCUMENTS

| | | | |
|---|---|---|---|
| CN | 101445639 B | 6/2009 | |
| CN | 103524976 A | 1/2014 | |
| EP | 3388482 B1 | 10/2018 | |
| EP | 3747945 A1 * | 12/2020 | ............ C08L 23/06 |
| JP | 2000344960 A | 12/2000 | |
| JP | 2004292669 A | 10/2004 | |
| JP | 2006241454 A | 9/2006 | |
| JP | 2015193695 A | 11/2015 | |
| JP | 2018027994 A | 2/2018 | |
| JP | 2021133504 A * | 9/2021 | |

OTHER PUBLICATIONS

First Office Action dated Jun. 2, 2022, for Chinese Patent Application No. 201980069439.0. 6 pages.
Extended European Search Report dated Jun. 29, 2022, for EP Application No. 19875739.5. 6 pages.
International Search Report and Written Opinion in PCT/JP2019/040858, dated Jan. 21, 2020. 8 pages.

* cited by examiner

*Primary Examiner* — Richard A Huhn
(74) *Attorney, Agent, or Firm* — Meunier Carlin & Curfman LLC

(57) ABSTRACT

A propylene resin composition comprising:
  100 parts by mass of a heterophasic propylene polymer material (A) comprising a propylene polymer (I) and an ethylene-α-olefin copolymer (II);
  0.1 to 5 parts by mass of an organo-modified siloxane compound (B) having a weight-average molecular weight of 10,000 to 90,000; and
  0.001 parts by mass to 5 parts by mass of a colorant (C).
The propylene polymer (I) is a propylene homopolymer (I-1) or a propylene copolymer (I-2).
The propylene copolymer (I-2): a copolymer comprising a structural unit derived from propylene and a structural unit derived from at least one olefin selected from the group consisting of ethylene and α-olefins having 4 to 12 carbon atoms, where
  an amount of the structural unit derived from at least one olefin selected from the group consisting of ethylene and α-olefins having 4 to 12 carbon atoms is 0.05 mass % or more and less than 10 mass %.

2 Claims, No Drawings

PROPYLENE RESIN COMPOSITION AND SHAPED BODY COMPRISING SAME

CROSS REFERENCE TO RELATED APPLICATIONS

This application is a United States National Phase Patent Application of International Patent Application Number PCT/JP2019/040858, filed on Oct. 17, 2019, which claims the benefit of priority to JP Application No. 2018-198973, filed Oct. 23, 2018, which are incorporated by reference herein in their entirety.

TECHNICAL FIELD

The present invention relates to a propylene resin composition and a molded article comprising the propylene resin composition.

BACKGROUND ART

Polypropylene-comprising molded articles are used as automotive interior parts. Automotive interior parts require scratch resistance. For example, Patent Document 1 discloses a molded article made of a propylene-based resin composition comprising a propylene-ethylene block copolymer, an ethylene-α-olefin copolymer, and a polyorganosilxoane having a weight-average molecular weight of 100,000 to 1,000,000.

PRIOR ART DOCUMENT

Patent Document

Patent Document 1: JP-A-2015-193695

SUMMARY OF THE INVENTION

Problems to be Solved by the Invention

Automotive interior parts have recently required further improvements in scratch resistance.

The present invention is directed to providing a propylene resin composition that can form a molded article having high scratch resistance.

Means for Solving the Problems

The present invention provides the following embodiments.

[1] A propylene resin composition, comprising:
  100 parts by mass of a heterophasic propylene polymer material comprising a propylene polymer (I) and an ethylene-α-olefin copolymer (II);
  0.1 to 5 parts by mass of an organo-modified siloxane compound (B) having a weight-average molecular weight of 10,000 to 90,000; and
  0.001 parts by mass to 5 parts by mass of a colorant (C).

The propylene polymer (I) is a propylene homopolymer (I-1) or a propylene copolymer (I-2).

The propylene copolymer (I-2): a copolymer comprising a structural unit derived from propylene and a structural unit derived from at least one olefin selected from the group consisting of ethylene and α-olefins having 4 to 12 carbon atoms, where an amount of the structural unit derived from at least one olefin selected from the group consisting of ethylene and α-olefins having 4 to 12 carbon atoms relative to 100 mass % of the total mass of the copolymer is 0.05 mass % or more and less than 10 mass %.

The ethylene-α-olefin copolymer (II): a copolymer comprising a structural unit derived from ethylene and a structural unit derived from at least one olefin selected from the group consisting of α-olefins having 3 to 12 carbon atoms, where an amount of the structural unit derived from ethylene relative to 100 mass % of a total mass of the copolymer is 10 mass % or more and 70 mass % or less.

[2] The propylene resin composition described in [1], wherein a ratio of a limiting viscosity of the ethylene-α-olefin copolymer (II) to a limiting viscosity of the propylene polymer (I) is 1 to 20.

[3] A molded article comprising the propylene resin composition described in [1] or [2].

Effect of the Invention

According to the present invention, a propylene resin composition that can form a molded article having high scratch resistance can be provided.

Mode for Carrying Out the Invention

[Propylene Resin Composition]

A propylene resin composition comprises 100 parts by mass of a heterophasic propylene polymer material (A), 0.1 to 5 parts by mass of an organo-modified siloxane compound. (B) having a weight-average molecular weight of 10,000 to 90,000, and 0.001 parts by mass to 5 parts by mass of a colorant (C).

The melt flow rate of the propylene resin composition measured at a temperature of 230° C. and a load of 2.16 kgf is preferably 5 to 200 g/10 min, more preferably 10 to 200 g/10 min, still more preferably 10 to 100 g/10 min, yet still more preferably 15 to 70 g/10 min, from the viewpoint of moldability.

Hereinafter, components contained in the propylene resin composition will be described.

[Heterophasic Propylene Polymer Material (A)]

The "heterophasic propylene polymer material (A)" is hereinafter referred to as a "component (A)". The component (A) is a polymer material comprising a propylene polymer (I) and an ethylene-α-olefin copolymer (II). The propylene resin composition may comprise one component or may comprise two or more components (A).

The "propylene polymer (I)" is hereinafter referred to as a "component (I)". The component (I) is a propylene homopolymer (I-1) or a propylene copolymer (I-2). The propylene homopolymer (I-1) is hereinafter referred to as a "component (I-1)", and the propylene "copolymer (I-2)" as a "component (I-2)".

The component (I-1) is a polymer having a structural unit derived from propylene.

The component (I-2) is a copolymer comprising a structural unit derived from propylene and a structural unit derived from at least one olefin selected from the group consisting of ethylene and α-olefins having 4 to 12 carbon atoms.

The amount of the structural unit derived from at least one olefin selected from the group consisting of ethylene and α-olefins having 4 to 12 carbon atoms relative to 100 mass % of the total mass of the copolymer is 0.05 mass % or more and less than 10 mass %.

In the component (I-2), the amount of the structural unit derived from propylene relative to 100 mass % of the total mass of the component (I-2) is preferably more than 90 mass % and 99.5 mass % or less.

Examples of α-olefins having 4 to 12 carbon atoms in the component (I-2) include 1-butene, 1-pentene, 1-hexene, 4-methyl-1-pentene, 1-octene, and 1-decease. Preferred are 1-butene, 1-hexene, and 1-octene.

In the component (I-2), the structural unit derived from at least one olefin selected from the group consisting of ethylene and α-olefins having 4 to 12 carbon atoms is preferably a structural unit derived from at least one olefin selected from the group consisting of ethylene, 1-butene, 1-hexene, and 1-octene, more preferably a structural unit, derived from ethylene.

The component (I-2) may include one or two or more structural units derived from at least one olefin selected from the group consisting of ethylene and α-olefins having 4 to 12 carbon atoms.

Examples of the component (I-2) include propylene-ethylene copolymer, propylene-1-butene copolymer, propylene-1-hexene copolymer, propylene-1-octene copolymer, propylene-ethylene-1-butene copolymer, propylene-ethylene-1-hexene copolymer, and propylene-ethylene-1-octene copolymer.

The "ethylene-α-olefin copolymer (II)" is hereinafter referred to as a "component (II)". The component (II) is an ethylene-α-olefin copolymer comprising a structural unit derived from ethylene and a structural unit derived from at least one olefin selected from the group consisting of α-olefins having 3 to 12 carbon atoms. The amount of the structural unit derived from ethylene relative to 100 mass % of the total mass of the copolymer is 10 mass % or more and 70 mass % or less. The amount of the structural unit derived from ethylene in the component (II) is preferably 20 mass % or more and 60 mass % or less, more preferably 30 to 55 mass %, still more preferably 40 to 55 mass %, yet still more preferably 40 to 50 mass %.

In the component (II), the amount of the structural unit derived from at least one olefin selected from the group consisting of α-olefins having 3 to 12 carbon atoms relative to 100 mass % of the total mass of the component (II) is preferably 30 mass % or more and 90 mass % or less, more preferably 50 mass % or more and 90 mass % or less.

Examples of α-olefins having 3 to 12 carbon atoms in the component (II) include propylene, 1-butene, 1-pentene, 1-hexene, 4-methyl-1-octene, and 1-decene. Propylene, 1-butene, 1-hexene, and 1-octene are preferred, and propylene is more preferred.

The component (II) may include one or two or more structural units derived from at least one olefin selected from the group consisting of α-olefins having 3 to 12 carbon atoms.

Examples of the component (II) include ethylene-propylene copolymer, ethylene-propylene-1-butene copolymer, and ethylene-propylene-1-hexene copolymer.

Examples of the component (A) include (propylene)-(ethylene-propylene) polymer material, (propylene) (ethylene-propylene-1-butene) polymer material, (propylene)-(ethylene-propylene-1-hexene) polymer material, (propylene-ethylene)-(ethylene-propylene) polymer material, (propylene-ethylene)-(ethylene-propylene-1-butene) polymer material, (propylene-ethylene)-(ethylene-propylene-1-hexene) polymer material, (propylene-1-butene)-(ethylene-propylene) polymer material, (propylene-1-butene)-(ethylene-propylene-1-butene) polymer material, and (propylene-1-butene)-(ethylene-propylene-1-hexene) polymer material.

The "(propylene)-(ethylene-propylene) polymer material" as described herein means "a heterophasic propylene polymer material" in which the component (I) is a propylene homopolymer and the component (II) is an ethylene-propylene copolymer. The same applies to other similar expressions.

The amount of the component (II) in the component (A) relative to 100 mass % of the total mass of the component (A) is preferably 1 to 40 mass %, more preferably 5 to 35 mass %, still more preferably 10 to 30 mass %, yet still more preferably 15 to 25 mass %.

The amount of the component (I) in the component relative to 100 mass % of the total mass of the component. (A) is preferably 60 to 99 mass %, more preferably 65 to 95 mass %, still more preferably 70 to 90 mass %, yet still more preferably 75 to 85 mass %.

The component (A) is preferably a heterophasic propylene polymer material comprising the component (I-1) and the component (II).

The component (A) is more preferably a heterophasic propylene polymer material that comprises the component (I-1) and the component (II) and in which the amount of the component (II) relative to 100 mass % of the total mass of the component (A) is 15 to 25 mass % and the amount of the structural unit derived from ethylene in the component (II) is 10 to 70 mass %.

The melt flow rate (hereinafter, referred to as an MFR) of the component (A) measured at a temperature of 230° C. and a load of 2.16 kgf is preferably 5 to 200 g/10 min. The MFR is preferably 10 to 200 g/10 min, more preferably 10 to 100 g/10 min, still more preferably 15 to 70 g/10 min, yet still more preferably 20 to 60 g/10 min, from the viewpoint of the moldability of the propylene resin composition and the impact resistance of a molded article comprising the resin composition.

The limiting viscosity of the component (A) measured in tetralin at 135° C. is preferably 0.5 to 5 dl/g, more preferably 0.8 to 3 dl/g, still more preferably 1 to 2 dl/g.

The limiting viscosity of the component (I) measured in tetralin at 135° C. is preferably 0.5 to 5 dl/g, more preferably 0.8 to 3 dl/g, still more preferably 0.9 to 1.5 dl/q. The "limiting viscosity of the component (I)" is hereinafter referred to as a "[η]I". The [η]I is preferably 0.5 dl/g or more from the viewpoint of the moldability of the propylene resin composition and the mechanical properties of a molded article comprising the resin composition. The [η]I is preferably 5 dl/g or less from the viewpoint of the moldability of the propylene resin composition.

The limiting viscosity of the component (II) measured in tetralin at 135° C. is preferably 1 to 10 dl/g, more preferably 1 to 7 dl/g, still more preferably 2 to 6 dl/g, yet still more preferably 2 to 5 dl/g. The "limiting viscosity of the component (II)" is hereinafter referred to as a "[η]II". The [η]II is preferably 10 dl/g or less from the viewpoint of the moldability of the propylene resin composition and the mechanical properties of a molded article comprising the resin composition. The [η]II is preferably 1 dl/g or more from the viewpoint of the moldability of the propylene resin composition.

The ratio of to [η]II to [η]I is preferably 1 to 20, more preferably 1.5 to 10, still more preferably 2 to 8, yet still more preferably 2 to 6, yet still more preferably 2 to 4, from the viewpoint of the moldability of the propylene resin composition and the mechanical properties of a molded article comprising the resin composition.

In this specification, the limiting viscosity (unit: dl/g) refers to a value measured at a temperature of 135° C. using tetralin as a solvent in accordance with the following method.

The reduced viscosity of three samples with a concentration of 0.1 g/dl, 0.2 g/dl, and 0.5 g/dl is measured by using an Ubbelohde viscometer. The limiting viscosity is determined in accordance with the calculation method described in page 491 in "Polymer Solution, Polymer Experiment 11" (published by Kyoritsu Shuppan Co., Ltd., 1982), that is, an extrapolation method involving plotting reduced viscosity against concentration and extrapolating the concentration to zero.

The mass ratio XI of the component to the total mass of the component (A) and the mass ratio XII of the component (II) to the total mass of the component (A) are determined from the $^{13}$C-NMR spectrum on the basis of on the report (Macromolecules, 1982, vol. 15, pages 1150-1152) by Kakugo et al. The $[\eta]$I is measured in accordance with the above method by sampling a portion of the component (I) obtained in the first step. The method for calculating the $[\eta]$II is as described below. The $[\eta]$Total represents the limiting viscosity of the component (A).

The $[\eta]$II is calculated in accordance with the following formula.

$$[\eta]II=([\eta]Total-[\eta]I\times XI)/XII$$

The isotactic pentad fraction measured by $^{13}$C-NMR of the component (I) is 0.96 or more, more preferably 0.97 or more, still more preferably 0.98 or more, from the viewpoint of the rigidity of the obtained molded article.

The isotactic pentad fraction refers to the fraction of the structural units derived from propylene at the centers of chains of five successive meso-bonded structural units derived from propylene, in terms of pentad units in the polypropylene molecule. The isotactic pentad fraction is measured by 13C-NMR spectroscopy described in the method reported by A. Zambelli et al. (Macromolecules, vol. 6, page 925, 1973). Assignment of $^{13}$C-NMR absorption peaks is carried out in accordance with. Macromolecules, vol. 8, page 687 (1975).

The component (A) can be manufactured by the polymerization method described below in the presence of a polymerization catalyst.

Examples of the polymerization catalyst include Ziegler catalyst systems; Ziegler-Natta catalyst systems; a catalyst system comprising an aikylaluminoxane and a Group 4 transition metal compound having a cyclopentadienyl ring; a catalyst system comprising a Group 4 transition metal compound having a cyclopentadienyl ring, a compound that reacts with the transition metal compound to form an ionic complex, and an organoaluminum compound; and a catalyst system obtained by treating these catalyst components together with particles, such as inorganic particles. In the presence of the above catalyst system, a prepolymerized catalyst prepared by prepolymerizing at least one olefin selected from the group consisting of ethylene and (α-olefins having 3 to 12 carbon atoms may be used.

Examples of the above catalyst systems include catalyst systems described in JP-A-61-218606, JP-A-5-194685, JP-A-7-216017, JP-A-10-212319, JP-A-2004-182981, and JP-A-9-316147.

Examples of the polymerization method include liquid phase polymerization, solution polymerization, slurry polymerization, and gas phase polymerization. Liquid phase polymerization involves polymerization using, as a medium, an olefin in the form of liquid at a polymerization temperature. Solution polymerization and slurry polymerization involve polymerization in an inert hydrocarbon solvent, such as propane, butane, isobutane, pentane, hexane, heptane, or octane. Gas phase polymerization involves polymerizing a gaseous monomer in a medium of the gaseous monomer. These polymerization methods may be batch methods or continuous methods, and these polymerization methods may be freely combined. From industrial and economic viewpoints, the method for manufacturing the component (A) is preferably a continuous gas phase polymerization method or a liquid phase-gas phase polymerization method in which liquid phase polymerization and gas phase polymerization are performed continuously.

Examples of the method for manufacturing the component (A) include (i) a method for manufacturing the component comprising
 a first step of polymerizing propylene in the presence of a polymerization catalyst to form the component (I-1), and
 a second step of polymerizing, in the presence of the component (I-1), ethylene and at least one olefin selected from the group consisting of α-olefins having 3 to 12 carbon atoms to form the component (II); and (ii) a method for manufacturing the component (A) comprising
 a first step of polymerizing, in the presence of a polymerization catalyst, propylene and at least one olefin selected from the group consisting of ethylene and α-olefins having 4 to 12 carbon atoms to form the component (I-2), and
 a second step of polymerizing, in the presence of the component (I-2), ethylene and at least one olefin selected from the group consisting of α-olefins having 3 to 12 carbon atoms to form the component (II).

Examples of the method for manufacturing the component (A) include methods described in JP-A-5-194685 and JP-A-2002-12719.

The polymerization conditions, such as polymerization temperature, polymerization pressure, monomer concentration, catalyst loading amount, and polymerization time, can be appropriately selected according to, for example, the amounts of the component (I) and the component (II), $[\eta]$I, $[\eta]$II, the amount of the structural unit derived from at least one olefin selected from the group consisting of ethylene and α-olefins having 4 to 12 carbon atoms in the component (I), and the amount of the structural unit derived from ethylene in the component (II).

To remove, for example, the residual solvent contained in the component (A) and ultra-low molecular weight oligomers generated as by-products during manufacture, the component (A) may be dried at a temperature equal to or lower than the melting temperature of the component (A). The component (A) during drying may have any shape, and may have a powder shape or pellet shape. Examples of the drying method include methods described in JP-A-55-75410 and JP-A-2-80433.

[Organo-Modified Siloxane Compound (B)]

In this specification, the term "organo-modified siloxane compound" refers to a polysiloxane comprising an organic group. Examples of the organic group include alkyl, aryl, alkoxy, amino, and epoxy groups. A compound formed by chemically bonding a polysiloxane and a thermoplastic resin is also an example of the organo-modified siloxane compound.

Examples of the thermoplastic resin include polyamides (e.g., Nylon 6, Nylon 66), polyolefins (e.g., polyethylene, polypropylene), polyesters (e.g., polyethylene terephthalate, polybutylene terephthalate), polycarbonate, polyamide-imide, polyphenylene sulfide, polyphenylene oxide, polysulfone, polyethersulfone, polyether ether ketone, polyetherimide, styrene resins (e.g., polystyrene, ABS resin), liquid crystal polyester, acrylonitrile-styrene copolymer, Nylon 6-Nylon 66 copolymer, and a mixture of these. The thermoplastic resin is preferably a polyamide or polyolefin, more preferably a polyolefin.

The "organo-modified siloxane compound (B)" is hereinafter referred to as a "component (B)".

The component (B) preferably comprises an alkyl group, more preferably comprises an alkyl group having 2 or more carbon atoms.

The component (B) has a weight-average molecular weight of 10,000 to 90,000. The weight-average molecular weight of the component (B) is preferably 10,000 to 60,000, more preferably 20,000 to 50,000.

In this specification, the weight-average molecular weight of the component (B) is determined by GPC. The elution temperature is 140° C. Shodex Packed Column A-80M available from Showa Denko K. K. is used as a column. Standard polystyrene (molecular weight 68 to 8,400,000) of Tosoh Corporation is used as a molecular weight standard substance. A test solution (400 µL) having about 1 g/L of the component (B) was prepared by dissolving about 5 mg of the component (B) in 5 ml of o-dichlorobenzene and injected into the column. The elution solvent flow rate was 1.0 mL/main. The component (B) was detected with a refractive index detector. The weight-average molecular weight is a polystyrene-equivalent weight-average molecular weight.

The propylene resin composition may comprise one component (B) or may comprise two or more components (B).

A masterbatch comprising the component (B) and a thermoplastic resin may be used as raw materials of the propylene resin composition. Examples of the thermoplastic resin in the masterbatch of the component (B) include the same thermoplastic resins as those illustrated as thermoplastic resins that may be chemically bonded to a polysiloxane.

The component (B) may be a commercial product. Examples of the masterbatch of the component (B) include "TEGOMER (registered trademark) Antiscratch 100" available from Evonik Industries AG (a masterbatch comprising the component (B) and polypropylene, the amount of the component (B) in the masterbatch: about 50 mass %).

The amount of the component (B) relative to 100 parts by mass of the component (A) is 0.1 to 5 parts by mass, preferably 0.5 to 4 parts by mass, more preferably 1 to 3 parts by mass.

[Colorant (C)]

The "colorant" is hereinafter referred to as a "component (C)". By using the component (C), the molded article can be colored with a desired color. The component (C) is preferably a pigment or dye. Examples of the pigment include black pigments and color pigments.

The propylene resin composition may comprise one component (C) or may comprise two or more components (C).

Examples of black pigments include inorganic black pigments, organic black pigments, coated particles having mineral black coating on their substrate surfaces, and a mixture of these.

Examples of inorganic black pigments include carbon blacks, iron oxide black pigments, titanium black pigments, copper oxide, manganese dioxide, chromium oxide, molybdenum disulfide, chromium complex, cobalt oxide, zinc sulfide, copper-chromium composite oxide, tin-antimony composite oxide, cobalt-nickel composite oxide, and copper-chromium composite oxide.

Examples of carbon blacks include carbon black, peach black (plant charcoal), bone black (bone charcoal), bitumen (asphalt), graphite, fullerenes, and carbon nanotubes. Examples of carbon black include acetylene black, furnace black, channel black, Ketjenblack, thermal black, medium thermal black, and lamp black (oil smoke).

Examples of iron oxide black pigments include iron black, ferrite, magnetite, manganese-iron composite oxide, iron-cobalt-chromium composite oxide, iron-cobalt composite oxide, and chromium-iron-nickel composite oxide. Examples of ferrite include non-magnetic ferrite and magnetic ferrite.

Examples of titanium black pigments include titanium black, spinel black, black titanium dioxide, titanium nitride, titanium-vanadium-antimony composite oxide, and iron-titanium composite oxide.

Examples of organic black pigments include azo pigments, perylene black, aniline black, phthalocyanine black, and anthraquinone black.

Examples of azo pigments include organic azo pigments described in, for example, JP-A-62-138857 and JP-A-3-266685 and azo pigments described in, for example, JP-B2-1726153, JP-A-2002-179943, JP-A-2002-256165, and U.S. Pat. No. 6,623,556B2). Specific examples include 2-hydroxy-N-(2'-methyl-4'-methoxyphenyl)-1-{[4-[(4,5,6,7-tetrachloro-1-oxo-2,3-dihydro-1H-isoindol-3-ylidene)amino]phenyl]azo}-11H-benzo[α]-carbazole-3-carboxamide.

Suitable examples of color pigments include pigments, such as red pigments, yellow pigments, orange pigments, purple pigments, blue pigments, green pigments, and brown pigments.

Examples of red pigments include naphthol pigments, azo pigments, quinacridone pigments, anthraquinone pigments, perylene pigments, and diketopyrrolopyrrole pigments.

Examples of yellow pigments include organic pigments, such as azo pigments, anthraquinone pigments, isoindolinone pigments, quinophthalone pigments, and benzimidazolone pigments; and inorganic pigments, such as titanium-nickel-antimony composite oxide and zinc-iron composite oxide.

Examples of orange pigments include naphthol pigments, azo pigments, benzimidazolone pigments, quinacridone pigments, and diketopyrrolopyrrole pigments.

Examples of purple pigments include azo pigments, rhodamine pigments, quinacridone pigments, carbazole pigments, perylene pigments, and quinacridone pigments.

Examples of blue pigments include organic pigments, such as phthalocyanine pigments; and inorganic pigments, such as cobalt-aluminum composite oxide, cobalt-aluminum-chromium composite oxide, and ultramarine blue.

Examples of green pigments include organic pigments, such as phthalocyanine pigments and azo pigments; and inorganic pigments, such as chromium oxide, cobalt-chromium-aluminum composite oxide, and cobalt-nickel-zinc composite oxide.

Examples of brown pigments include organic pigments, such as azo pigments and benzimidazolone pigments; and inorganic pigments, such as iron oxide and titanium-chromium-antimony composite oxide.

The average primary particle size of the pigment is preferably 0.005 to 5 µm, more preferably 0.008 to 3 µm, still more preferably 0.010 to 0.050 µm, from the viewpoint of the dispersibility of the pigment and the color tone of the molded article. The average primary particle size of the pigment is an arithmetic mean of equivalent circular diameters obtained by observing about 20 to 50 particles in an image of a sample, which is prepared by a dusting method, captured with a transmission electron microscope (available from JEOL Ltd.) at a magnification of about 50,000 to 1,000,000 times in accordance with JIS Z8901-2006 "Test powders and test particles", 5.4.4 Particle size distribution, (c) Microscopic method.

Examples of the dye include acid dyes, direct dyes, basic dyes, salt-forming dyes, oil-soluble dyes, disperse dyes, reactive dyes, mordant dyes, vat dyes, and sulfur dyes.

Examples of acid dyes include anthraquinone acid dyes, phthalocyanine acid dyes, quinoline acid dyes, azine acid dyes, indigoid acid dyes, xanthene acid dyes, and triphenylmethane acid dyes.

Examples of direct dyes include azo direct dyes, thiazole direct dyes, anthraquinone direct dyes, oxazine direct dyes, and phthalocyanine direct dyes.

Examples of basic dyes include azo basic dyes, azine basic dyes, acridine basic dyes, methine basic dyes, thiazole basic dyes, thiazine basic dyes, oxazine basic dyes, anthraquinone basic dyes, xanthene basic dyes, and triarylmethane basic dyes.

Examples of oil-soluble dyes include anthraquinone oil-soluble dyes, phthalocyanine oil-soluble dyes, quinoline oil-soluble dyes, azine oil-soluble dyes, indigoid oil-soluble dyes, methine oil-soluble dyes, azo oil-soluble dyes, aminoketone oil-soluble dyes, xanthene oil-soluble dyes, and triphenylmethane oil-soluble dyes.

Examples of disperse dyes include anthraquinone disperse dyes, quinoline disperse dyes, indigoid disperse dyes, quinophthalone disperse dyes, methine disperse dyes, azo disperse dyes, aminoketone disperse dyes, and xanthene disperse dyes.

In addition, salt-forming dyes, such as salt-forming products of the above acid dyes and cationic compounds, salt-forming products of the above basic dyes and anionic compounds, or salt-forming products of acid dyes and basic dyes, can be used.

The component (C) is preferably carbon black or iron black, more preferably carbon black.

The amount of the component (C) relative to 100 parts by mass of the component (A) is 0.001 parts by mass to 5 parts by mass, preferably 0.1 parts by mass to 4 parts by mass, more preferably 0.25 parts by mass to 3 parts by mass.

When the amount of the component (C) is 0.001 parts by mass or more, sufficient blackness can be achieved. When the amount of the component (C) is 5 parts by mass or less, color unevenness can be prevented or reduced.

The propylene resin composition may comprise one component (C) or may comprise two or more components (C).

A masterbatch comprising the component (C) and a resin may be used as raw materials of the propylene resin composition. The resin in the masterbatch of the component (C) is preferably an olefin resin, more preferably an olefin resin having a melting temperature lower than the melting temperature of the component (A) and having a melt viscosity lower than the melt viscosity of the component (A).

The masterbatch is prepared by melt-kneading the component (C) and the resin. The amount of the component (C) in the masterbatch relative to 100 parts by mass of the total mass of the masterbatch is preferably 10 parts by mass to 80 parts by mass, more preferably 20 parts by mass to 60 parts by mass.

[Ethylene-α-Olefin Copolymer (D)]

The propylene resin composition may further comprise an ethylene-α-olefin copolymer (D) comprising a structural unit derived from ethylene and a structural unit derived from at least one olefin selected from the group consisting of α-olefins having 4 to 12 carbon atoms. The "ethylene-α-olefin copolymer (D)" is hereinafter referred to as a "component (D)".

The amount of the structural unit derived from ethylene relative to 100 mass % of the total mass of the component (D) is preferably 50 mass % or more and 99 mass % or less, preferably 50 to 95 mass %, more preferably 50 to 75 mass %.

Examples of α-olefins having 4 to 12 carbon atoms include 1-butene, 1-pentene, 1-hexene, 4-methyl-1-pentene, 1-octene, and 1-decene. Among these, 1-butene, 1-hexene, and 1-octene are preferred. The α-olefins may be α-olefins having a cyclic structure, such as vinylcyclopropane and vinylcyclobutane.

Examples of the component (D) include ethylene-1-butene copolymer, ethylene-1-hexene copolymer, ethylene-1-octene copolymer, ethylene-1-decene copolymer, ethylene-(3-methyl-1-butene) copolymer, and a copolymer of ethylene and an α-olefin having a cyclic structure.

The melt flow rate of the component (D) measured at a temperature of 190° C. and a load of 2.16 kgf is preferably 0.1 q/10 min to 50 g/10 min, more preferably 0.1 g/10 min to 5 g/10 min, still more preferably 0.2 g/10 min to 1.0 g/10 min, from the viewpoint of low glossiness and mechanical properties of the molded article.

The density of the component (D) is preferably 0.850 to 0.940 g/m$^3$, more preferably 0.850 to 0.920 g/cm$^3$, still more preferably 0.855 to 0.910 g/cm$^3$, yet still more preferably 0.860 to 0.880, yet still more preferably 0.860 to 0.870, from the viewpoint of the impact resistance of the molded article.

The component (D) can be manufactured by copolymerizing ethylene and an α-olefin having 4 or more carbon atoms in the presence of a polymerization catalyst.

Examples of the polymerization catalyst include homogeneous catalysts, such as metallocene catalysts, and Ziegler-Natta catalysts.

Examples of homogeneous catalysts include a catalyst comprising an alkylaluminoxane and a Group 4 transition metal compound having a cyclopentadienyl ring; a catalyst comprising a Group 4 transition metal compound having a cyclopentadienyl ring, a compound that reacts with the transition metal compound to form an ionic complex, and an organoaluminum compound; and a catalyst produced by modifying inorganic particles (e.g., silica, clay minerals) with a catalyst component (e.g., a Group 4 transition metal compound having a cyclopentadienyl ring, a compound that forms an ionic complex, an organoaluminum compound) such that the catalyst component is supported on the inorganic particles.

Examples of Ziegler-Natta catalysts include a catalyst comprising a titanium-containing solid transition metal component and an organometallic component in combination.

The component (D) may be a commercial product. Examples of commercial products of the component (D) include ENGAGE (registered trademark) available from Dow Chemical Japan Ltd.; TAFMER (registered trademark) available from Mitsui Chemicals, Inc.; NEO-ZEX (registeredtrademark) and ULT-ZEX (registered trademark) available from Prime Polymer Co., Ltd.; and EXCELLEN FX (registered trademark), SUMIKATHENE (registered trademark), and ESPRENE SPO (registered trademark) available from Sumitomo Chemical Co., Ltd.

The amount of the component (D) relative to 100 parts by mass of the component (A) is preferably 1 to 100 parts by mass, more preferably 3 to 80 parts by mass, still more preferably 5 to 30 parts by mass, yet still more preferably 5 to 15 parts by mass.

[Vinyl Aromatic Compound-Containing Rubber]

The propylene resin composition may contain a vinyl aromatic compound-containing rubber in order to further improve the balance of the mechanical properties. Examples of the vinyl aromatic compound-containing rubber include a block copolymer composed of a vinyl aromatic compound polymer and a conjugated diene polymer, and a hydrogenated product of the block copolymer. The percentage of hydrogenation of double bonds of the conjugated diene polymer in the hydrogenated product of the block copolymer relative to 100 mass % of the total mass of double bonds contained in the conjugated diene polymer portion is preferably 80 mass % or more, more preferably 85 mass % or more.

The molecular weight distribution of the vinyl aromatic compound-containing rubber measured by GPC is preferably 2.5 or less, more preferably 1 to 2.3.

The amount of the vinyl aromatic compound contained in the vinyl aromatic compound-containing rubber relative to 100 mass % of the total mass of the vinyl aromatic compound-containing rubber is preferably 10 to 20 mass %, more preferably 12 to 19 mass %.

The MFR of the vinyl aromatic compound-containing rubber measured at a temperature of 230° C. and a load of 2.16 kgf in accordance with JIS K7210 is preferably 0.01 to 15 g/10 min, more preferably 0.03 to 13 g/10 min.

Examples of the vinyl aromatic compound-containing rubber include block copolymers, such as styrene-ethylene-butene-styrene rubber, styrene-ethylene-propylene-styrene rubber, styrene-butadiene rubber, styrene-butadiene-styrene rubber, and styrene-isoprene-styrene rubber; and hydrogenated block copolymers of these block copolymers. Examples of the vinyl aromatic compound-containing rubber further include a rubber produced by causing ethylene-propylene-unconjugated diene rubber to react with a vinyl aromatic compound, such as styrene. Two or more vinyl aromatic compound-containing rubbers may be used in combination.

An example method for manufacturing the vinyl aromatic compound-containing rubber involves bonding a vinyl aromatic compound to an olefin copolymer rubber or a conjugated diene rubber through, for example, polymerization or reaction.

The amount of the vinyl aromatic compound-containing rubber relative to 100 parts by mass of the component (A) is preferably 5 to 30 parts by mass.

[Modified Polyolefin Resin]

The propylene resin composition may comprise a modified polyolefin resin in order to further improve the balance of the mechanical properties.

In this specification, the modified polyolefin resin refers to a polymer comprising a structural unit derived from at least one olefin and a structural unit derived from an unsaturated carboxylic acid and/or its derivative. The modified polyolefin resin is a polymer other than the component (A) and the component (D).

Examples of the method for manufacturing the modified polyolefin resin include the following methods (1) and (2).

The method (1) includes a step of graft polymerization of an unsaturated carboxylic acid and/or its derivative onto an olefin homopolymer, a copolymer of at least two olefins, or a heterophasic propylene polymer material.

The method (2) includes a step of copolymerizing at least one olefin and an unsaturated carboxylic acid and/or its derivative.

More specifically, the method for manufacturing the modified polyolefin resin may be the method illustrated in, for example, "Practical Polymer Alloy Design" (written by Fumio Ide, Kogyo Chosakai Publishing Co., Ltd. (1996)), Prog. Polym. Sci., 24, 81-142 (1999), and JP-A-2002-308947. The method may be a solution method, a bulk method, or a melt-kneading method. These methods may be used in combination to manufacture the modified polyolefin resin.

Examples of the unsaturated carboxylic acid used in the modified polyolefin resin include maleic acid, fumaric acid, itaconic acid, acrylic acid, and methacrylic acid. Examples of the derivative of the unsaturated carboxylic acid include anhydrides, ester compounds, amide compounds, imide compounds, and metal salts of the unsaturated carboxylic acid. Specific examples include maleic anhydride, itaconic anhydride, methyl acrylate, ethyl acrylate, butyl acrylate, glycidyl acrylate, methyl methacrylate, ethyl methacrylate, butyl methacrylate, glycidyl methacrylate, monoethyl maleate, diethyl maleate, monomethyl fumarate, dimethyl fumarate, acrylamide, methacrylamide, maleic acid monoamide, maleic acid diamide, fumaric acid monoamide, maleimide, N-butylmaleimide, and sodium methacrylate. In addition, substances, such as citric acid and malic acid, which are dehydrated in the step of grafting on propylene polymer to form an unsaturated carboxylic acid, may also be used.

The unsaturated carboxylic acid and/or its derivative is preferably acrylic acid glycidyl ester, methacrylic acid glycidyl ester, or maleic anhydride.

The amount of the modified polyolefin resin relative to 100 parts by mass of the component (A) is preferably 0.1 to 10 parts by mass.

[Additive]

The propylene resin composition may further comprise an additive. Examples of the additive include neutralizers, antioxidants, processing stabilizers, UV absorbers, nucleating agents, clarifying and nucleating agents, antistatic agents, lubricants, processing aids, metal soaps, foaming agents, antibiotics, plasticizers, flame retardants, cross-linking agents, cross-linking aids, brightening agents, inorganic fillers, and organic fillers. The propylene resin composition may comprise one additive or may comprise two or more additives.

The propylene resin composition preferably comprises an antioxidant from the viewpoint of moldability and long-term stability against photodegradation. Examples of the antioxidant include phenolic antioxidants, phosphorus antioxidants, sulfur antioxidants, and hydroxylamine antioxidants.

The antioxidant is preferably a phenolic antioxidant or a phosphorus antioxidant.

Examples of the phenolic antioxidant include tetrakis[methylene-3(3',5'di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycol-N-bis-3-(3-tert-butyl-5-methyl-4-hydroxyphenyl)propionate, 1,6-hexanediol bis[3-(3,5-di-tert-butyl-4-hydroxyphenyl)propionate], 2,2-thio-diethylene bis[3-(3,5-di-tert-butyl-4-hydroxyphenyl)propionate], 1,3,5-tris[3(3,5-di-tert-butyl-4-hydroxyphenyl)propionyloxy]ethyl isocyanate, 1,3,5-trimethyl-2,4,6-tris(3,5-di-tert-butyl-4)-hydroxybenzyl) benzene, tris(3,5-di-tert-butyl-4-hydroxybenzyl)isocyanurate, and 1,3,5-tris(4-tert-butyl-3-hydroxy-2,6-dimethylbenzyl)isocyanurate.

From the viewpoint of the moldability and thermal resistance of the propylene resin composition, the phenolic antioxidant preferably has a molecular weight of 300 or more. Examples of such an antioxidant include tetrakis [methylene-3(3',5'di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, triethylene glycol-N-bis-3-(3-tert-butyl-5-methyl-4-hydroxyphenyl)propionate, 1,6-hexanediol bis[3-(3,5-di-tert-butyl-4-hydroxyphenyl)propionate], and 2,2-thio-diethylene bis[3-(3,5-di-tert-butyl-4-hydroxyphenyl)propionate].

From the viewpoint of hue stability, the phenolic antioxidant is more preferably 3,9-bis[2-{3-(3-tert-butyl-4-hydroxy-5-methylphenyl)propionyloxy}-1,1-dimethylethyl]-2,4,8,10-tetraoxaspiro[5.5]undecane.

The amount of the phenolic antioxidant relative to 100 parts by mass of the component (A) is normally 0.01 to 1 part by mass, preferably 0.01 to 0.5 parts by mass, more preferably 0.05 to 0.3 parts by mass.

Examples of the phosphorus antioxidant include tris(nonylphenyl)phosphite, tris(2,4-di-tert-butylphenyl)phosphite, distearyl pentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4-dicumylphenyl)pentaerythritol diphosphite, tetrakis (2,4-di-tert-butylphenyl)-4,4'-biphenylene diphosphonite, 2,2'-methylene bis(4,6-di-tert-butylphenyl)2-ethylhexyl phosphite, 2,2'-ethylidene bis(4,6-di-tert-butylphenyl) fluorophosphite, bis(2,4-di-tert-butyl-6-methylphenyl) ethylphosphite, 2-(2,4,6-tri-tert-butylphenyl)-5-ethyl-5-butyl-1,3,2-oxaphosphorinane, 2,2',2"-nitrilo[triethyl-tris(3,3',5, 5'-tetra-tert-butyl-1,1'-biphenyl-2,2'-diyl)phosphite, and 2,4, 8,10-tetra-tert-butyl-6-[3-(3-methyl-4-hydroxy-5-tert-butylphenyl) propoxy]dibenzo[d,f][1,3,2]dioxaphosphepin.

From the viewpoint of the moldability and thermal stability of the propylene resin composition, the phosphorus antioxidant preferably has a molecular weight of 300 or more. Examples of such a phosphorus antioxidant include tris(2,4-di-tert-butylphenyl)phosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, and 2,4,8,10-tetra-tert-butyl-6-[3-(3-methyl-4-hydroxy-5-tert-butylphenyl)propoxy]dibenzo[d,f][1,3,2]dioxaphosphepin.

The amount of the phosphorus antioxidant relative to 100 parts by mass of the component (A) is normally 0.01 to 1 part by mass, preferably 0.01 to 0.5 parts by mass, more preferably 0.05 to 0.3 parts by mass.

In a preferred aspect, the propylene resin composition comprises 0.01 to 1 part by mass of a phenolic antioxidant having a molecular weight of 300 or more and/or a phosphorus antioxidant having a molecular weight of 300 or more, relative to 100 parts by mass of the component (A).

Examples of nucleating agents include inorganic nucleating agents and organic nucleating agents.

Examples of inorganic nucleating agents include talc, clay, and calcium carbonate. When the nucleating agent is an inorganic nucleating agent, the inorganic nucleating agent may be pretreated with a silane coupling agent, a fatty acid, and other acidic or basic substances in order to prevent particle aggregation and improve dispersibility in the component. (A).

Examples of organic nucleating agents include metal salts of aromatic carboxylic acids, metal salts of dicarboxylic acids having carboxyl groups on two carbon atoms on the ring of a cyclic saturated or unsaturated hydrocarbon, such as those described in WO 02/79312 and WO 02/77092, metal salts of aromatic phosphoric acids, dibenzylidene sorbitols, and polymeric nucleating agents (poly-3-methylbutene-1, polycyclopentene, and polyvinylcyclohexane).

Examples of metal salts of aromatic carboxylic acids include compounds having a benzoic acid group which is a substituted cyclic hydrocarbon structure. Examples of metal atoms of metal salts of aromatic carboxylic acids include Group 1 metal atoms, Group 2 metal atoms, Group 4 metal atoms, Group 13 metal atoms, and Group 14 metal atoms in the periodic table of elements. Group 1 metal atoms, Group 2 metal atoms, and Group 13 metal atoms are preferred.

Specific examples of Group 1 metal atoms include lithium, sodium, and potassium. Specific examples of Group 2 metal atoms include magnesium, calcium, strontium, and barium. Specific examples of Group 4 metal atoms include titanium and zirconium. Specific examples of Group 13 metal atoms include aluminum and gallium. Specific examples of Group 14 metal atoms include germanium, tin, and lead.

The metal salts of aromatic carboxylic acids are preferably lithium benzoate, potassium benzoate, sodium benzoate, aluminum benzoate, hydroxy-di(para-tert-butylbenzoate) aluminum, sodium cyclohexanecarboxylate, and sodium cyclopentanecarboxylate, more preferably sodium benzoate and hydroxy-di(para-tert-butylbenzoate) aluminum.

Examples of metal salts of dicarboxylic acids having carboxyl groups on two carbon atoms on the ring of a cyclic saturated or unsaturated hydrocarbon, such as those described in WO 02/79312 and WO 02/77092 include metal salts of hexahydrophthalic acid group. Preferred is disodium-(1R,2R,3S,4S)-bicyclo[2.2.1]heptane-2,3-dicarboxylate (Hyperform [registered trademark] HPN-68L (available from Milliken Japan K.K.) represented by the following structural formula.

Examples of metal salts of aromatic phosphoric acids include aromatic phosphate metal salts having substituted C1-C12 hydrocarbon groups. Examples of metal atoms bonded to the aromatic phosphoric acid group of such a metal salt include Group 1 metal atoms, Group 2 metal atoms, Group 4 metal atoms, Group 13 metal atoms, and Group 14 metal atoms in the periodic table of elements. Group 1 metal atoms and Group 2 metal atoms are preferred.

Specific examples of Group 1 metal atoms include lithium, sodium, and potassium. Specific examples of Group 2 metal atoms include magnesium, calcium, strontium, and barium. Specific examples of Group 4 metal atoms include titanium and zirconium. Specific examples of Group 13 metal atoms include aluminum and gallium. Specific examples of Group 14 metal atoms include germanium, tin, and lead.

Suitable examples of metal salts of aromatic phosphoric acids include sodium 2,2'-methylenebis(4,6-di-tert-butylphenyl)phosphate, in which the metal atom is sodium (product name: ADEKA STAB [registered trademark] NA-11 available from ADEKA Corporation); and hydroxy aluminum bis(2,4,8,10-tetra-tert-butyl-6-hydroxy-12H-dibenzo[d,g][1,3,2]dioxaphosphocin-6-oxide, in which the metal atom is aluminum, (main component of product name ADEKA STAB [registered trademark] NA-21 available from ADEKA Corporation).

Examples of dibenzylidene sorbitols include 1,3:2,4-di(p-methylbenzylidene) sorbitol, 1,3-o-methylbenzylidene 2,4-p-methylbenzylidene sorbitol, 1,3:2,4-di(benzylidene) sorbitol, 1,3:2,4-di-(p-ethylbenzylidene) sorbitol, and 1,3:2,4-bis(3,4-dimethylbenzylidene) sorbitol. Preferred is 1,3:2,4-di(benzylidene) sorbitol from the viewpoint of odor.

The nucleating agent is normally in the form of particles and can be manufactured by a known method, such as a pulverization method, a crystallization method, or a combination of a pulverization method and a crystallization method. The nucleating agent preferably has a weight-average particle size of 0.01 to 10 μm as measured by laser diffraction particle size distribution analysis. To prevent aggregation of particles of the nucleating agent during preparation of the nucleating agent by a pulverization method, the nucleating agent may be prepared while being in contact with a surface treatment agent.

The amount of the nucleating agent relative to 100 parts by mass of the component (A) is preferably 0.001 to 1 part by mass, more preferably 0.01 to 1 part by mass, still more preferably 0.01 to 0.5 parts by mass. The amount of the nucleating agent is preferably 0.001 parts by mass or more from the viewpoint of the rigidity and impact resistance of the obtained molded article. The amount of the nucleating agent is preferably 1 part by mass or less from the viewpoint of the impact resistance of the obtained molded article.

Examples of inorganic fillers include non-fibrous inorganic fillers, fibrous inorganic fillers, and a mixture thereof. Examples of non-fibrous inorganic fillers include talc, mica, cubic calcium carbonate, spindle-shaped calcium carbonate, columnar calcium carbonate, plate-shaped barium sulfate, columnar barium sulfate, granular magnesium carbonate, clay, granular alumina, spherical silica, granular calcium sulfate, silica sand, carbon black, spherical titanium oxide, spherical magnesium hydroxide, columnar magnesium hydroxide, zeolite, diatomaceous earth, sericite, Shirasu, spherical calcium hydroxide, spherical calcium sulfite, spherical sodium sulfate, bentonite, and spherical graphite.

Examples of fibrous inorganic fillers include fibrous magnesium oxysulfate, fibrous potassium titanate, fibrous magnesium hydroxide, fibrous aluminum borate, fibrous calcium silicate, fibrous calcium carbonate, carbon fiber, glass fiber, and metal fiber.

The inorganic fillers are preferably talc, mica, spindle-shaped calcium carbonate, silica, fibrous magnesium oxysulfate, and fibrous wollastonite, more preferably talc and fibrous magnesium oxysulfate. The propylene resin composition may comprise two or more inorganic fillers.

The amount of the inorganic filler relative to 100 parts by mass of the component (A) is preferably 1 to 25 parts by mass. In an aspect, the amount of the inorganic filler relative to 100 parts by mass of the component (A) to produce a black molded article is preferably 5 parts by mass or less, more preferably 1 part by mass or less. In an aspect, the amount of the inorganic filler relative to 100 parts by mass of the component (A) is preferably 0 parts by mass.

Examples of organic fillers include natural fibers, such as lignin, starch, wood flour, wood fiber, bamboo, cotton, cellulose, and nanocellulose fiber; and products comprising such natural fibers.

The amount of the organic filler relative to 100 parts by mass of the component (A) is preferably 1 to 25 parts by mass.

[Method for Manufacturing Propylene Resin Composition]

The propylene resin composition can be manufactured by a method comprising a step of melt-kneading the component (A), the component (B), the component (C), and other optional components.

Before the melt-kneading step, raw materials may be premixed with a mixer (e.g., a Henschel mixer, a tumbler mixer, or a Nauta mixer).

The melt-kneading temperature is preferably 180° C. or higher and 300° C. and lower, more preferably 180° C. or higher and 270° C. and lower.

The melt-kneaded material obtained in the melt-kneading step may be passed through a filter.

Examples of melt kneaders include single-screw extruders, co-rotating twin-screw extruders, the Banbury mixer, and co-kneaders.

By adding an organic peroxide to the raw materials in the step of melt-kneading the component (A), the component (B), and the component (C), the MFR of the obtained propylene resin composition can be adjusted.

Examples of the organic peroxide include alkyl peroxides, diacyl peroxides, ester peroxides, and carbonate peroxides. Examples of alkyl peroxides include dicumyl peroxide, di-tert-butyl peroxide, tert-butylcumyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, and 3,6,9-triethyl-3,6,9-trimethyl-1,4,7-triperoxonane.

Examples of diacyl peroxides include benzoyl peroxide, lauroyl peroxide, and decanoyl peroxide. Examples of ester peroxides include 1,1,3,3-tetramethylbutylperoxyneodecanoate, α-cumylperoxyneodecanoate, tert-butylperoxyneodecanoate, tert-butylperoxyneoheptanoate, tert-butylperoxypivalate, tert-hexylperoxypivalate, 1,1,3,3-tetramethylbutylperoxy-2-ethylhexanoate, tert-amylperoxyl-2-ethylhexanoate, tert-butylperoxy-2-ethylhexanoate, tert-butylperoxyisobutyrate, di-tert-butylperoxyhexahydroterephthalate, tert-amylperoxy-3,5,5-trimethylhexanoate, tert-butylperoxy-3,5,5-trimethylhexanoate, tert-butylperoxyacetate, tert-butylperoxybenzoate, and di-tert-butylperoxytrimethyladipate.

Examples of carbonate peroxides include di-3-methoxybutyl peroxydicarbonate, di(2-ethylhexyl) peroxydicarbonate, diisopropyl peroxycarbonate, tert-butyl peroxyisopropylcarbonate, di(4-tert-butylcyclohexyl) peroxydicarbonate, dicetyl peroxydicarbonate, and dimyristyl peroxydicarbonate.

The organic peroxide is preferably an alkyl peroxide, more preferably 2,5-dimethyl-2,5-di(tert-butylperoxy) hexane, 1,3-bis(tert-butylperoxyisopropyl)benzene, or 3,6,9-triethyl-3,6,9-trimethyl-1,4,7-triperoxonane.

The amount of the organic peroxide used relative to 100 parts by mass of the component (A) is normally 0.0001 to 0.5 parts by mass, preferably 0.0005 to 0.3 parts by mass, more preferably 0.001 to 0.1 parts by mass.

The organic peroxide may be used in the form of impregnation powder (masterbatch) produced by impregnating a powder of the component (A) with the organic peroxide. The weight-average particle size of the powder is normally in the range of 100 μm to 2000 μm from the viewpoint of the dispersibility of the organic peroxide in the component (A). The impregnation amount of the organic peroxide is normally 1 to 50 mass %, preferably 5 to 20 mass % in view of ease of handling.

Examples of the shape of the propylene resin composition include strand shape, sheet shape, flat plate shape, and pellet shape formed by cutting strands into an appropriate length.

From the viewpoint of production stability during molding for forming a molded article, the propylene resin composition is preferably in the form of pellets 1 to 50 mm in long side, and the length of the long side of the pellets is more preferably 1 to 10 mm, still more preferably 2 to 5 mm.

The propylene resin composition is such that the L* of a molded article formed by injection-molding the propylene resin composition into a mold cavity, MD 400 mm×TD 100 mm×thickness 3 mm, under conditions of a molding temperature of 220° C., a mold cooling temperature of 50° C., and an injection rate of 23 mm/sec is preferably 40% or less, more preferably 30% or less, still more preferably 25% or less.

In this specification, the L* refers to a CIE 1976 lightness specified in JIS Z8781-4. In this specification, the L* is measured with a multi-angle spectrophotometer at an incident angle of 45 degrees.

The propylene resin composition is such that the specular glossiness (measured at an incident angle of 60 degrees) of a molded article formed by injection-molding the propylene resin composition into a mold cavity (the cavity includes a mirror surface), MD 400 mm×TD 100 mm×thickness 3 mm, under conditions of a molding temperature of 220° C., a mold cooling temperature of 50° C., and an injection rate of 23 mm/sec is preferably 70% or less, more preferably 60% or less. In this specification, the specular glossiness is measured in accordance with JIS Z8741-1997.

[Molded Article]

A molded article comprising the propylene resin composition can be produced by molding the propylene resin composition. The shape and size of the molded article can be appropriately selected. Examples of the molded article include a monolayer molded article comprising the propylene resin composition; and a multilayer molded article comprising a layer comprising the propylene resin composition and a layer comprising a resin other than the propylene resin composition.

The L* of the molded article is preferably 40% or less, more preferably 30% or less, still more preferably 2.5% or less.

The specular glossiness of the molded article measured at an incident angle of 60 degrees is preferably 70% or less, more preferably 60% or less.

Examples of the method for manufacturing a molded article include an injection molding method, a press molding method, a vacuum molding method, a foam molding method, and an extrusion molding method. Examples of the method for manufacturing a multilayer molded article include a forming method involving attaching a layer comprising the propylene resin composition and a layer comprising a resin other than the propylene resin composition to each other; and a co-extrusion molding method.

The molded article is preferably an injection-molded article, more preferably an injection-molded article having a thickness of 1 mm or more. Examples of the injection molding method include a typical injection molding method, an injection foam molding method, a supercritical injection foam molding method, an ultra-high speed injection molding method, an injection compression molding method, a gas-assisted injection molding method, a sandwich molding method, a sandwich foam molding method, and an insert-outsert molding method.

The molded article may be manufactured by a method involving molding, into a molded article, a mixture of a composition comprising the component (A), the component (B), and other optional components and a masterbatch comprising the component (C).

Examples of applications of the molded article include automotive materials, home appliance materials, building materials, bottles, containers, sheets, and films. Suitable applications include automotive interior parts, home appliance materials, and building materials (particularly products present in human residential space).

Examples of automotive materials include interior parts, such as door trims, pillars, instrumental panels, consoles, rocker panels, armrests, door panels, and spare tire covers; exterior parts, such as bumpers, spoilers, fenders, and side steps; parts, such as air intake ducts, coolant reservoir tanks, fender liners, fans, and under deflectors; and integrally molded parts, such as front-end panels.

Examples of home appliance materials include materials for washing machines (outer tubs), materials for dryers, materials for vacuum cleaners, materials for rice cookers, materials for pots, materials for warming machines, materials for dishwashers, materials for air purifiers, materials for air conditioners, and materials for lighting fixtures.

Examples of building materials include indoor floors, walls, and window frames.

EXAMPLES

The present invention will be described below with reference to Examples and Comparative Examples.

(1) Component (A)

A heterophasic propylene polymer material (A-1) and a heterophasic propylene polymer material (A-2) were each manufactured by a liquid phase (first step)—gas phase (second step) polymerization method (multi-stage polymerization method) using a catalyst prepared by the method described in Example 5 of JP-A-7-216017. The "heterophasic propylene polymer material (A-1)" is hereinafter referred to as a "component (A-1)", and the "heterophasic propylene polymer material (A-2)" as a "component (A-2)".

Component (A-1)
Propylene-(ethylene-propylene) polymer material
MFP, (230° C.) of component (A-1): 28 g/10 min
Limiting viscosity ([η]Total) of component (A-1): 1.41 dl/g $[\eta]II/[\eta]I=2.7$ Component (I): propylene homopolymer
Isotactic pentad fraction of component (I): 0.983
Limiting viscosity [η]I of component (I): 1.06 dl/g
Component (II): ethylene-propylene copolymer
Amount of component (II): 19.5 mass %
Amount of structural unit derived from ethylene in component (II): 39 mass %
Limiting viscosity [η]II of component (II): 2.85 dl/g Component (A-2)
Propylene-(ethylene-propylene) polymer material
MFR (230° C.) of component (A-2): 30 g/10 min
Limiting viscosity ([η]Total) of component (A-2): 1.43 dl/g $[\eta]II/[\eta]I=3.1$ Component (I): propylene homopolymer
Limiting viscosity [η]I of component (I): 1.03 dl/g
Component (II): ethylene-propylene copolymer
Amount of component (II): 18.6 mass %
Amount of structural unit derived from ethylene in component (II): 48.2 mass %
Limiting viscosity [η]II of component (II): 3.18 dl/g (2) Component (B)

(B-1) Masterbatch Containing Polypropylene and Organo-Modified Siloxane Compound Containing Alkyl Group Having 2 or More Carbon Atoms Product name: TEGOMER (registered trademark) Anti-scratch 100 (the amount of organo-modified siloxane compound in the masterbatch: about 50 mass %) available from Evonik Industries AG Weight-average molecular weight of organo-modified siloxane compound: 35,000

(B-2) Polydimethylsiloxane-Containing Masterbatch

Product name: GENIOPLAST PELLET S (the amount of polydimethyisiloxane in the masterbatch: about 70 mass %) available from Wacker Chemie AG Weight-average molecular weight of polydimethysiloxane: 460,000

(3) Component (C)

(C-1) Carbon Black-Containing Masterbatch

Product name: PPCM 917Y95 (a masterbatch containing carbon black and polyethylene, the amount of carbon black: 26 mass %) available from Tokyo Printing Ink Mfg. Co., Ltd., the primary particle size of carbon black: 0.014 μm (C-2)

Product name: PPCM 908Y89 (a masterbatch containing carbon black and polyethylene, the amount of carbon black: 8 mass %) available from Tokyo Printing Ink Mfg. Co., Ltd., the primary particle size of carbon black: 0.013 μm (4) Component (D)

(D-1) Ethylene-1-Butene Copolymer

Product name: EXCELLEN "VL 100" available from Sumitomo Chemical Co., Ltd.

Density: 0.900 (g/cm$^3$)

MFR (190° C., load 2.16 kg): 0.8 g/10 min.

(D-2) Ethylene-1-Butene Copolymer

Product name: ENGAGE 7380 available from DuPont Dow Elastomer

Density: 0.870 (g/cm$^3$)

MFR (190° C., load 2.16 kg): 0.3 g/10 min

The physical properties were measured in accordance with the following test methods.

(1) Melt Flow Rate (MFR, unit: g/10 min)

The MFR was measured under a load of 2.16 kg in accordance with the method specified in JIS K6758. The MFR of the component (A) and the propylene resin composition was measured at a temperature of 230° C., and the MFR of the component (D) was measured at a temperature of 190° C.

(2) Limiting Viscosity ([η], unit: dl/g)

The reduced viscosity of three samples with a concentration of 0.1 g/dl, 0.2 g/dl, and 0.5 g/dl was measured by using an Ubbelohde viscometer. The limiting viscosity was determined in accordance with the calculation method described in page 491 in "Polymer Solution, Polymer Experiment 11" (published by Kyoritsu Shuppan Co., Ltd., 1982), that is, an extrapolation method involving plotting reduced viscosity against concentration and extrapolating the concentration to zero. The limiting viscosity was measured at a temperature of 135° C. using tetralin as a solvent. The limiting viscosity of the component (A) was measured by using a powder of the component (A). The [η]I was measured by using a powder of the component (I) obtained in the first step.

(3) Calculation of [η]II

The [η]II was calculated in accordance with the following formula where XI represents the mass ratio of the component (I) to the total mass of the component (A), XII represents the mass ratio of the component (II) to the total mass of the component (A), and [η]Total represents the limiting viscosity of the component (A).

$$[\eta]II=\{[\eta]\text{Total}-([\eta]I\times XI)\}/XII$$

XI and XII were calculated from the $^{13}$C-NMR spectrum described below.

(4) Calculation of Amount (mass %) of Component (A), Amount (mass %) of Component (II) in Component (A), and Amount (mass %) of Structural Unit Derived from Ethylene in Component (II)

These amounts were determined from the $^{13}$C-NMR spectrum measured under the following conditions on the basis of the report (Macromolecules, 1982, vol. 15, pages 1150-1152) by Kakugo at al.

In a test tube 10 mm in diameter, about 200 mg of the component (A) was uniformly dissolved in 3 ml of a mixed solvent (ortho-dichlorobenzene/deuterated ortho-dichlorobenzene=4/1 (volume ratio)) to prepare a sample. The $^{13}$C-NMR spectrum of the sample was measured under the following conditions. The measurement was performed by using JNM-EX270 available from JEOL Ltd.

Measurement temperature: 135° C.

Pulse repetition time: 10 seconds

Pulse width: 45°

Number of scans: 2500

(5) Weight-Average Molecular Weight

The weight-average molecular weight of the component (B) was measured by GPC using a 150C/GPC system available from Waters Corporation. The elution temperature was 140° C. Shodex Packed Column A'-80M available from Showa Denko K. K. was used as a column. Standard polystyrene (molecular weight 68 to 8,400,000) of Tosoh Corporation was used as a molecular weight standard substance. A test solution (400 μL) having about 1 g/L of the component (B) was prepared by dissolving about 5 mg of the component (B) in 5 mL of o-dichlorobenzene and injected into the column. The elution solvent flow rate was 1.0 mL/min. The component (B) was detected with a refractive index detector. The weight-average molecular weight is a polystyrene-equivalent weight-average molecular weight.

(6) Specular Gloss

The specular glossiness (incident angle 60 degrees, specular gloss value) of a test piece obtained in the section (10) below was measured by using Micro-gloss available from BYK-Gardner. As the glossiness decreases, the gloss of the molded article decreases, which is preferred.

(7) Blackness

As an indicator of blackness, the L* (incident angle 45 degrees) of the embossed surface of a test piece obtained in the section (10) below was measured by using a multi-angle spectrophotometer (BYK-mac available from BYK-Gardner). As the L* decreases, the blackness increases, which is preferred.

(8) Scratch Resistance:

The scratch resistance of a test piece obtained in the section (10) below was measured by the following method.

Scratch tester: Special large U-F scratch tester available from Ueshima Seisakusho Co., Ltd.

The scratch tester has a scratch tip processed so as to have a ball shape with a radius of curvature of 1.0 mm Measurement method: the embossed surface of the test piece was scratched with the scratch tip of the scratch tester under a predetermined load at a scratch rate of 10 mm/sec, and the scratch morphology was visually determined at an angle of 90 degrees with respect to the test piece. The load under which scratch whitening started to become noticeable was determined by increasing the measurement load from the first measurement load 10 N in increments of 1 N. The load under which scratch whitening started to become noticeable was determined 3 times for each Example, and the mean of three loads was defined as a "scratching load". The test temperature was 23° C. As the scratching load increases, the scratch resistance increases.

(9) Appearance

After being left to stand for 2 days under conditions of 23° C. and a relative humidity of 50%, the test piece was observed to determine the presence of exudates on the surface.

(10) Method for Producing Injection-Molded Article

The test pieces used for the specular gloss, blackness, scratch resistance, and appearance observation described above were produced in accordance with the following method.

By using an injection-molding machine (SE [registered trademark] 180D available from Sumitomo Heavy Industries, Ltd.) comprising a mold, MD 400 mm×TD 100 mm×thickness 3 mm, having an automotive interior leather embossing surface on one surface and a mirror surface on the other surface, injection molding was performed at a molding temperature of 220° C., a mold cooling temperature of 50° C., and an injection rate of 23 mm/sec to produce an injection-molded article. The produced injection-molded article was cut into test pieces 90 mm×90 mm×thickness 3 mm. The test pieces were used for each measurement after being left to stand for 2 days under conditions of 23° C. and a relative humidity of 50%.

Example 1

[Manufacture of Propylene Resin Composition]

After 100 parts by mass of the component (A-1), 3.2 parts by mass of the component (B-1), 6.0 parts by mass of the component (C-1), and 7.5 parts by mass of the component (D-1) were uniformly premixed, the resulting mixture was melt-kneaded in a twin-screw kneading extruder at an extrusion rate of 50 kg/hr, 230° C., and a screw rotation speed of 200 rpm to manufacture a propylene resin composition. The physical properties of the produced propylene resin composition are described below in Table 1.

Examples 2 to 4, Comparative Examples 1 to 3

Propylene resin compositions were produced in the same manner as in Example 1 except that raw materials were changed as described in Table 1. The physical properties of the produced propylene resin composition are described below in Table 1.

TABLE 1

|  | Example 1 | Example 2 | Comparative Example 1 | Comparative Example 2 | Comparative Example 3 |
|---|---|---|---|---|---|
| (A-1) (parts by mass) | 100 | — | 100 | 100 | — |
| (A-2) (parts by mass) | — | 100 | — | — | 100 |
| (B-1) (parts by mass) | 3.2 | 3.4 | — | — | — |
| (B-2) (parts by mass) | — | — | 3.2 | — | — |
| (C-1) (parts by mass) | 6.5 | 3.4 | — | — | 3.4 |
| (C-2) (parts by mass) | — | — | 3.2 | 3.2 | — |
| (D-1) (parts by mass) | 7.5 | — | 7.5 | 7.5 | — |
| (D-2) (parts by mass) | — | 13.6 | — | — | 13.6 |
| Organo-modified siloxane compound content (parts by mass) relative to 100 parts by mass of (A) | 1.6 | 1.7 | 2.3 | — | — |
| Carbon black content (parts by mass) relative to 100 parts by mass of (A) | 1.7 | 0.9 | 0.3 | 0.3 | 0.9 |
| MFR (g/10 min) of resin composition | 34 | 38 | 23 | 30 | 38 |
| Scratch resistance (N) | 27 | 23 | 13 | 10 | 15 |
| Glossiness (%) | 59 | 49 | 56 | 66 | 60 |
| L* (%) | 19.7 | 19.1 | 22.5 | 20.5 | 19.0 |
| Appearance | no exudate | no exudate | no exudate | no exudate | no exudate |

TABLE 2

|  | Example 3 | Example 4 |
|---|---|---|
| (A-1) (parts by mass) | — | 100 |
| (A-2) (parts by mass) | 100 | — |
| (B-1) (parts by mass) | 3.2 | 4.6 |
| (B-2) (parts by mass) | — | — |
| (C-1) (parts by mass) | 6.5 | — |
| (C-2) (parts by mass) | — | 3.2 |
| (D-1) (parts by mass) | 7.5 | 7.5 |
| (D-2) (parts by mass) | — | — |
| Organo-modified siloxane compound content (parts by mass) relative to 100 parts by mass of (A) | 1.6 | 2.3 |
| Carbon black content (parts by mass) relative to 100 parts by mass of (A) | 1.7 | 0.3 |
| MFR (g/10 min) of resin composition | 31 | 37 |
| Scratch resistance (N) | 23 | 25 |
| Glossiness (%) | 38 | 58 |
| L* (%) | 19.5 | 22.3 |
| Appearance | no exudate | no exudate |

The invention claimed is:

1. A propylene resin composition, comprising:
   100 parts by mass of a heterophasic propylene polymer material (A) comprising a propylene polymer (I) and an ethylene-α-olefin copolymer (II);
   0.1 to 5 parts by mass of an organo-modified siloxane compound (B) having a weight-average molecular weight of 10,000 to 90,000; and
   0.001 parts by mass to 5 parts by mass of a colorant (C),
   wherein the propylene polymer (I) is a propylene homopolymer (I-1) or a propylene copolymer (I-2), wherein
   the propylene copolymer (I-2) is a copolymer comprising a structural unit derived from propylene and a structural unit derived from at least one olefin selected from the group consisting of ethylene and α-olefins having 4 to 12 carbon atoms, where
   an amount of the structural unit derived from at least one olefin selected from the group consisting of ethylene and α-olefins having 4 to 12 carbon atoms relative to 100 mass % of a total mass of the copolymer is 0.05 mass % or more and less than 10 mass %, and
   wherein the ethylene-α-olefin copolymer (II) is a copolymer comprising a structural unit derived from ethylene and a structural unit derived from at least one olefin selected from the group consisting of α-olefins having 3 to 12 carbon atoms, where
   an amount of the structural unit derived from ethylene relative to 100 mass % of a total mass of the copolymer is 10 mass % or more and 70 mass % or less;
   and wherein a ratio of a limiting viscosity of the ethylene-α-olefin copolymer (II) to a limiting viscosity of the propylene polymer (I) is 1 to 20, wherein the limiting viscosity is measured at a temperature of 135° C. in tetralin.

2. A molded article, comprising the propylene resin composition according to claim 1.

* * * * *